(12) United States Patent
Arguelles et al.

(10) Patent No.: US 12,249,109 B2
(45) Date of Patent: Mar. 11, 2025

(54) ELECTRONIC DEVICE FOR ACQUIRING LOCATION INFORMATION ON BASIS OF IMAGE, AND METHOD FOR OPERATING SAME

(71) Applicant: Samsung Electronics Co., Ltd., Gyeonggi-do (KR)

(72) Inventors: Shakira Arguelles, Rizal (PH); Mark Andrew Dancel Bautista, Rizal (PH); Justin Adrian Pineda Pelayo, Rizal (PH); Jose Ricardo Iv Ramos Ruiz, Rizal (PH); Kyle Benedict G Sy, Rizal (PH); Angelica Tabang Zalameda, Rizal (PH)

(73) Assignee: Samsung Electronics Co., Ltd (KR)

( * ) Notice: Subject to any disclaimer, the term of this patent is extended or adjusted under 35 U.S.C. 154(b) by 195 days.

(21) Appl. No.: 17/607,265

(22) PCT Filed: Jan. 29, 2020

(86) PCT No.: PCT/KR2020/001327
§ 371 (c)(1),
(2) Date: Oct. 28, 2021

(87) PCT Pub. No.: WO2020/226264
PCT Pub. Date: Nov. 12, 2020

(65) Prior Publication Data
US 2022/0187092 A1    Jun. 16, 2022

(30) Foreign Application Priority Data

May 6, 2019    (PH) .............................. 1-2019-050076

(51) Int. Cl.
*G06T 7/73*    (2017.01)
*G01C 21/36*    (2006.01)
(Continued)

(52) U.S. Cl.
CPC ....... *G06V 10/462* (2022.01); *G01C 21/3623* (2013.01); *G06T 7/73* (2017.01); *G06V 20/10* (2022.01); *G06V 20/50* (2022.01)

(58) Field of Classification Search
CPC ...... G06V 10/462; G06V 20/10; G06V 20/50; G06V 2201/10; G01C 21/3623;
(Continued)

(56) References Cited

U.S. PATENT DOCUMENTS 6,133,947 A     10/2000   Mikuni
7,983,691 B1 *   7/2011   Wong .................... G01S 5/0284
                                                              455/456.2
(Continued)

FOREIGN PATENT DOCUMENTS

CN    104869585 A  *  8/2015  .............. G01S 11/06
CN    109961458 A  *  7/2019  ........... G06K 9/6267
(Continued)

OTHER PUBLICATIONS

KR20120116202A.FOR. English.translation.pdf, Kim et al., Method of Location Recognition Using Mobile Terminal Andthereof Apparatus (Year: 2012).*
(Continued)

*Primary Examiner* — B M M Hannan
(74) *Attorney, Agent, or Firm* — The Farrell Law Firm, P.C.

(57) ABSTRACT

Disclosed is a method, performed by an electronic device, of obtaining location information of the electronic device, the method including obtaining at least one image captured by the electronic device, identifying a plurality of feature points included in the at least one image, obtaining a plurality of distances between the plurality of feature points and the electronic device, obtaining location information of the plurality of feature points, generating a plurality of circles
(Continued)

having the obtained distances as radii and having the plurality of feature points as centers, based on the location information of the plurality of feature points, and obtaining location information of the electronic device based on a point where the plurality of circles overlap each other.

15 Claims, 5 Drawing Sheets

(51) Int. Cl.
  *G06V 10/46* (2022.01)
  *G06V 20/10* (2022.01)
  *G06V 20/50* (2022.01)
(58) Field of Classification Search
  CPC ............ G06T 7/73; G06T 2207/20081; G06T 2207/20084; G06T 7/74
  USPC ........................................................ 701/523
  See application file for complete search history.

(56) References Cited

U.S. PATENT DOCUMENTS

| | | | |
|---|---|---|---|
| 9,521,521 B2 | 12/2016 | Hillary et al. | |
| 9,542,770 B1 | 1/2017 | Lininger | |
| 11,734,570 B1* | 8/2023 | Kurz ...................... | G06N 5/046 706/25 |
| 2002/0059207 A1* | 5/2002 | Shimazu .............. | H04N 13/194 348/E13.02 |
| 2005/0094280 A1* | 5/2005 | Ahn ....................... | G01N 21/95 359/618 |
| 2007/0018974 A1* | 1/2007 | Fujiwara ................ | G09B 29/12 345/419 |
| 2007/0179705 A1* | 8/2007 | Asai .................... | H04N 1/00244 707/E17.026 |
| 2009/0237269 A1* | 9/2009 | Okugi .................... | G08G 1/163 340/901 |
| 2009/0303077 A1 | 12/2009 | Onome et al. | |
| 2011/0123135 A1* | 5/2011 | Hsieh ........................ | G06T 7/73 382/285 |
| 2011/0242311 A1* | 10/2011 | Miyajima ............... | G06F 18/28 348/116 |
| 2011/0242319 A1 | 10/2011 | Myajima | |
| 2011/0243455 A1* | 10/2011 | Miyajima .......... | G01C 21/3602 382/201 |
| 2011/0243457 A1* | 10/2011 | Miyajima ............... | G06V 20/10 382/209 |
| 2011/0246027 A1* | 10/2011 | Miyajima ............... | G06F 18/00 707/E17.022 |
| 2011/0282988 A1* | 11/2011 | Wang .................. | H04L 43/0852 709/224 |
| 2011/0285842 A1* | 11/2011 | Davenport .............. | B61L 27/40 348/116 |
| 2011/0299736 A1* | 12/2011 | Choi ...................... | G06V 20/10 382/106 |
| 2013/0322767 A1* | 12/2013 | Chao ........................ | G06T 7/73 382/199 |
| 2014/0037138 A1* | 2/2014 | Sato ....................... | G06V 20/58 382/103 |
| 2014/0104425 A1* | 4/2014 | Kiyono .................. | B60R 11/04 348/148 |
| 2014/0125588 A1* | 5/2014 | Wei ...................... | G06F 3/0416 345/157 |
| 2014/0160249 A1* | 6/2014 | Ro .......................... | G06T 7/593 348/47 |
| 2014/0257688 A1* | 9/2014 | Chao .................... | G01C 21/005 701/446 |
| 2014/0267775 A1* | 9/2014 | Lablans .................. | G06T 7/246 348/169 |
| 2015/0158429 A1* | 6/2015 | Bort ..................... | G01B 11/002 348/148 |
| 2015/0181548 A1* | 6/2015 | Varoglu .................. | H04W 4/33 455/456.2 |
| 2016/0335385 A1* | 11/2016 | Ho ....................... | G03F 7/70441 |
| 2017/0061527 A1* | 3/2017 | Vakilian .................... | G06T 7/70 |
| 2017/0096106 A1 | 4/2017 | Higuchi et al. | |
| 2017/0264919 A1* | 9/2017 | Amine .................. | H04N 21/251 |
| 2017/0345311 A1* | 11/2017 | Sugiura .................. | G06V 20/58 |
| 2018/0005073 A1* | 1/2018 | Kawano ................ | G06V 20/588 |
| 2018/0057030 A1 | 3/2018 | Puttagunta et al. | |
| 2018/0061069 A1* | 3/2018 | Higaki ....................... | G06T 7/50 |
| 2018/0061075 A1* | 3/2018 | Kawano .................... | G06T 7/70 |
| 2018/0067187 A1* | 3/2018 | Oh ......................... | H04W 64/00 |
| 2018/0238691 A1 | 8/2018 | Cui et al. | |
| 2019/0004282 A1* | 1/2019 | Park ........................ | H04N 23/67 |
| 2019/0041523 A1* | 2/2019 | Muramatsu ........ | G01C 21/3848 |
| 2019/0164313 A1* | 5/2019 | Ma ......................... | G06V 10/44 |
| 2019/0197717 A1* | 6/2019 | Cho ........................... | G06T 7/11 |
| 2019/0285754 A1* | 9/2019 | van Diggelen ....... | G01S 19/428 |
| 2019/0291726 A1* | 9/2019 | Shalev-Shwartz .... | B60W 10/18 |
| 2019/0318498 A1* | 10/2019 | Yoshikawa ............ | G06V 20/56 |
| 2019/0356849 A1* | 11/2019 | Sapienza ................ | G06V 20/10 |
| 2020/0082170 A1* | 3/2020 | Kwon ..................... | G06F 18/22 |
| 2020/0250846 A1* | 8/2020 | Oka .......................... | G01C 3/14 |
| 2020/0279392 A1* | 9/2020 | Shamir ..................... | G06T 7/70 |
| 2021/0240762 A1* | 8/2021 | Mayster .................. | G06F 16/29 |

FOREIGN PATENT DOCUMENTS

| | | | | |
|---|---|---|---|---|
| EP | 1898291 A1 * | 3/2008 | .......... | G05D 1/0253 |
| EP | 2372310 A2 * | 10/2011 | ............. | G01C 21/26 |
| EP | 2372605 A2 * | 10/2011 | ......... | G01C 21/3602 |
| FR | 3061288 | 6/2018 | | |
| JP | 2011-227037 | 11/2011 | | |
| JP | 2013088348 A * | 5/2013 | | |
| KR | 1020120116202 | 10/2012 | | |
| KR | 1020150019085 | 2/2015 | | |
| KR | 10-1706627 | 2/2017 | | |
| KR | 10-1878685 | 7/2018 | | |
| WO | WO 2012/091326 | 7/2012 | | |
| WO | WO-2014092193 A1 * | 6/2014 | .......... | A63F 13/213 |
| WO | WO-2015194501 A1 * | 12/2015 | ............... | B60R 1/00 |

OTHER PUBLICATIONS

PH Examination Report dated Jun. 16, 2020 issued in counterpart application No. 1-2019-050076, 13 pages.
Hang Chu et al., "GPS Refinement and Camera Orientation Estimation From a Single Image and a 2D Map", 2014 IEEE Conference on Computer Vision and Pattern Recognition Workshops, Jun. 23, 2014, 8 pages.
European Search Report dated Apr. 28, 2022 issued in counterpart application No. 20801462.1-1207, 10 pages.
What is GNSS?, EU Agency for the Space Programme, HTTPS://www.GSA.EUROPA.EU/EUROPEAN-GNSS/WHAT-GNSS, 2016, 4 pages.
gps.gov, "GPS Applications", https://www.gps.gov/applications/, Nov. 25, 2014, 1 page.
gps.gov, "GPS Accuracy", 2021, https://www.gps.gov/systems/gps/performance/accuracy/#how-accurate, 3 pages.
M. Wright, M. Russel, J. Brockhaus, "Myth Busted: Civilian GPS Receivers Actually do Have Access to the L2 Frequency", 2011, 3 pages.
European Global Navigation Satellite Systems Agency, "World's First Dual-frequency GNSS Smartphone hits the Market", Jun. 4, 2018, 6 pages.
Quasi-Zenith Satellite System (QZSS), "List of Positioning Satellites", https://qzss.go.jp/en/technical/satellites/index.html, Nov. 24, 2021, 9 pages.
International Search Report dated May 12, 2020 issued in counterpart application No. PCT/KR2020/001327, 15 pages.
European Search Report dated Mar. 13, 2024 issued in counterpart application No. 20801462.1-1207, 4 pages.

* cited by examiner

ELECTRONIC DEVICE FOR ACQUIRING LOCATION INFORMATION ON BASIS OF IMAGE, AND METHOD FOR OPERATING SAME

PRIORITY

This application is a National Phase Entry of PCT International Application No. PCT/KR2020/001327 which was filed on Jan. 29, 2020, and claims priority to Philippine Patent Application No. 1-2019-050076, which was filed on May 6, 2019, the entire content of each of which is incorporated herein by reference.

TECHNICAL FIELD

The disclosure relates to an electronic device for obtaining location information based on an image captured by the electronic device, and a method of operating the same.

BACKGROUND ART

Location information of an electronic device, which is obtained using global positioning system (GPS) technology, includes an error due to various factors until a GPS signal from a GPS satellite reaches the electronic device. For example, the GPS location information may include an error based on the state of the atmosphere through which the GPS signal passes, or an ambient environment of the electronic device for receiving the GPS signal (e.g., presence of an obstacle).

Therefore, a method of correcting the location information obtained using the GPS technology, based on various types of information related to the location information of the electronic device is required.

DESCRIPTION OF EMBODIMENTS

Solution to Problem

Provided are an electronic device for obtaining location information based on an image captured by the electronic device, and a method of operating the same.

Provided is a computer-readable recording medium having recorded thereon a computer program for executing the method. Technical problems to be solved are not limited to the above-described problems, and other technical problems may also be present.

MODE OF DISCLOSURE

According to a first aspect of the disclosure, there is provided a method, performed by an electronic device, of obtaining location information of the electronic device, the method including obtaining at least one image captured by the electronic device, identifying a plurality of feature points included in the at least one image, obtaining a plurality of distances between the plurality of feature points and the electronic device, obtaining location information of the plurality of feature points, generating a plurality of circles having the obtained distances as radii and having the plurality of feature points as centers, based on the location information of the plurality of feature points, and obtaining location information of the electronic device based on a point where the plurality of circles overlap each other.

According to a second aspect of the disclosure, there is provided an electronic device for obtaining location information of the electronic device, the electronic device including a camera for obtaining at least one image captured by the electronic device, a memory for storing data required to obtain location information of the electronic device, and at least one processor configured to identify a plurality of feature points included in the at least one image, based on the data, obtain a plurality of distances between the plurality of feature points and the electronic device, obtain location information of the plurality of feature points, generate a plurality of circles having the obtained distances as radii and having the plurality of feature points as centers, based on the location information of the plurality of feature points, and obtain location information of the electronic device based on a point where the plurality of circles overlap each other.

According to a third aspect of the disclosure, there is provided a recording medium having recorded thereon a computer program for executing the method of the first aspect.

Hereinafter, the disclosure will be described in detail by explaining embodiments of the disclosure with reference to the attached drawings in such a manner that one of ordinary skill in the art can easily carry out the embodiments. The disclosure may, however, be embodied in many different forms and should not be construed as being limited to the embodiments set forth herein. In the drawings, parts not related to the disclosure are not illustrated for clarity of explanation, and like reference numerals denote like elements throughout.

Throughout the specification, when an element is referred to as being "connected to" another element, the element can be "directly connected to" the other element or be "electrically connected to" the other element via an intervening element. The terms "comprises", "comprising", "includes" and/or "including", when used herein, specify the presence of stated elements, but do not preclude the presence or addition of one or more other elements, unless otherwise indicated herein.

Artificial intelligence (AI)-related functions according to the disclosure are performed using a processor and a memory. The processor may include one or more processors. In this case, each of the one or more processors may be a general-purpose processor such as a central processing unit (CPU), an application processor (AP), or a digital signal processor (DSP), a dedicated graphics processor such as a graphics processing unit (GPU) or a vision processing unit (VPU), or a dedicated AI processor such as a neural processing unit (NPU). The one or more processors control input data to be processed according to a predefined operation rule or AI model stored in the memory. Alternatively, when the one or more processors are dedicated AI processors, the dedicated AI processors may be designed in a hardware structure specialized for processing a specific AI model.

The predefined operation rule or AI model is characterized by being made through training. Herein, being made through training means that a basic AI model is trained based on a learning algorithm by using a plurality of pieces of training data and thus a predefined operation rule or AI model configured to achieve a desired feature (or purpose) is made. The training may be performed directly by a device having an AI function according to the disclosure, or via a separate server and/or system. Examples of the learning algorithm may include supervised learning, unsupervised learning, semi-supervised learning, and reinforcement learning, but are not limited thereto.

The AI model may include a plurality of neural network layers. Each of the plurality of neural network layers has a plurality of weight values and performs neural network computation through computation between a computation result of a previous layer and the plurality of weight values. The plurality of weight values of the plurality of neural network layers may be optimized based on a result of training the AI model. For example, the plurality of weight values may be updated to reduce or minimize a loss or cost value obtained by the AI model during the training process. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

Reference will now be made in detail to embodiments of the disclosure, examples of which are illustrated in the accompanying drawings.

Figure 1:
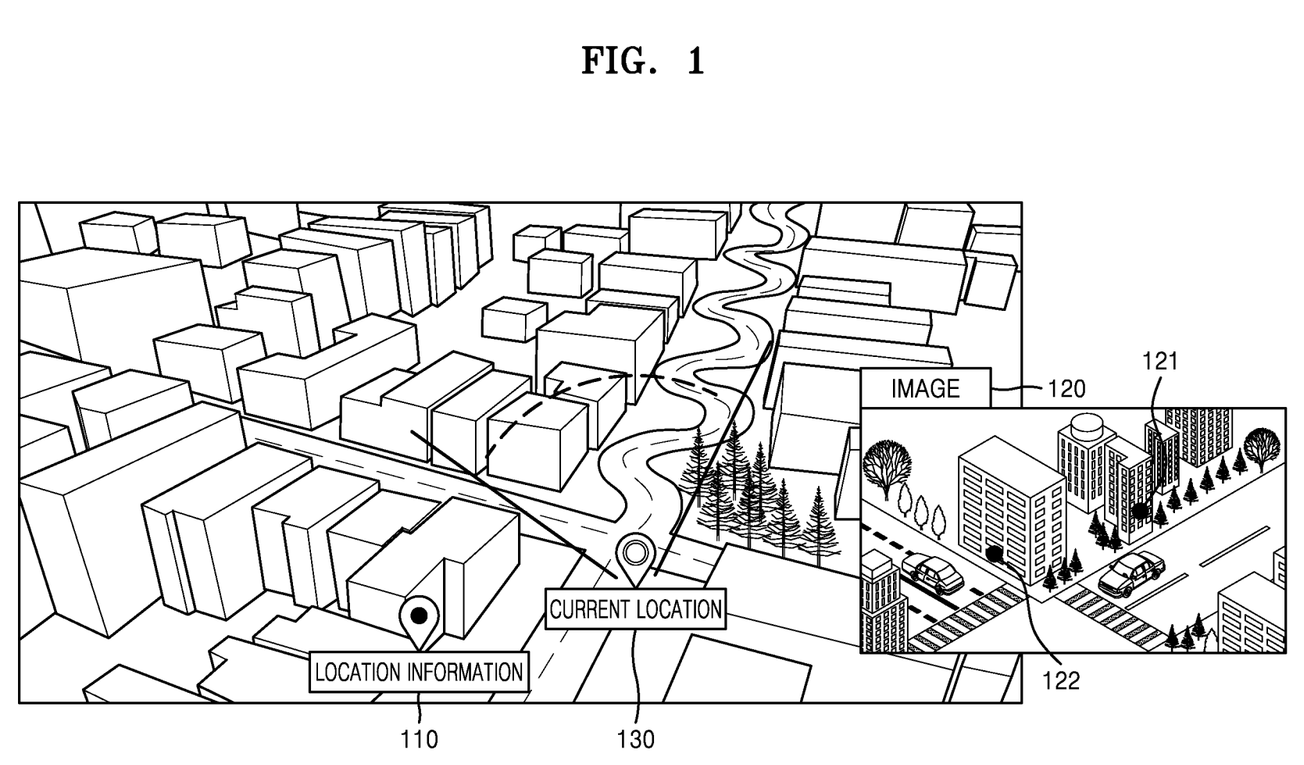
FIG. 1 is a diagram showing an example of obtaining location information of an electronic device, according to an embodiment.

FIG. 1 is a diagram showing an example of obtaining location information 110 of an electronic device 1000, according to an embodiment.

Referring to FIG. 1, the electronic device 1000 may obtain location information corresponding to a current location 130 of the electronic device 1000 by correcting the location information 110 obtained at the current location 130 of the electronic device 1000, based on an image 120 captured at the current location 130 of the electronic device 1000.

The electronic device 1000 according to an embodiment may be implemented in various forms. For example, the electronic device 1000 described herein may include a digital camera, a smartphone, a laptop computer, a tablet personal computer (PC), an e-book reader, a digital broadcast receiver, a personal digital assistant (PDA), a portable multimedia player (PMP), a navigation system, or an MP3 player, but is not limited thereto. The electronic device 1000 described herein may be a wearable device that may be worn by a user. The wearable device may include at least one of an accessory-type device (e.g., a watch, a ring, a wristband, an ankle band, a necklace, glasses, or contact lenses), a head-mounted device (HMD), a fabric- or clothing-integrated device (e.g., electronic clothing), a body-attachable device (e.g., a skin pad)), and an implantable device (e.g., an implantable circuit), but is not limited thereto. For convenience of explanation, the following description is focused on a smartphone as an example of the electronic device 1000.

The location information 110 obtained by the electronic device 1000 according to an embodiment may be location information obtained by a location sensor included in the electronic device 1000 to detect the location information. For example, the location information 110 may be global positioning system (GPS) location information obtained by a GPS sensor.

However, the location information 110 obtained according to an embodiment may differ from the real location 130 of the electronic device 1000 due to an error of the location sensor. For example, when a GPS signal received by the location sensor of the electronic device 1000 is distorted due to an obstacle or when the electronic device 1000 is in an environment where a GPS signal is not receivable (e.g., inside a tunnel or a building), the location information obtained based on the GPS signal may significantly differ from the real location 130 of the electronic device 1000.

The electronic device 1000 according to an embodiment may obtain the location information corresponding to the current location 130 by correcting the location information 110 including an error, based on the image 120.

According to an embodiment, the electronic device 1000 may obtain the image 120 captured at the current location 130 of the electronic device 1000. The location information 110 obtained by the electronic device 1000 according to an embodiment may be corrected based on the image 120 captured by the electronic device 1000.

The electronic device 1000 according to an embodiment may identify a plurality of feature points 121 and 122 included in the image 120, and correct the location information 110 of the electronic device 1000 to location information close to the current location 130, based on the identified feature points 121 and 122.

The plurality of feature points according to an embodiment may be identified based on a landmark identified in the image 120. For example, the electronic device 1000 may set a region of interest on a map for indicating the location of the electronic device 1000, based on the location information 110 before being corrected, and identify at least one landmark included in the region of interest, based on pre-stored information about the landmark.

The region of interest according to an embodiment may be set as a preset-sized region on the basis of the location information 110 before being corrected. Alternatively, the region of interest may be determined as a region within a first distance determined based on the longest distance from among distances from the electronic device 1000 to objects included in the image, on the basis of the location information 110.

According to an embodiment, distance information between the electronic device 1000 and at least one object included in the image may be analyzed. For example, the distances from the electronic device 1000 to the objects included in the image may be obtained by analyzing the image by using a pre-trained AI model. The electronic device 1000 according to an embodiment may determine the region of interest by setting, as the first distance, the longest distance from among the obtained distances from the electronic device 1000.

Without being limited to the above-described example, the region of interest for identifying the landmark may be determined in various manners.

The electronic device 1000 according to an embodiment may identify the landmark included in the image 120, by using information about the at least one landmark included in the region of interest. For example, the electronic device 1000 may identify the landmark included in the image 120, by comparing information about the exterior of the at least one landmark to feature information of the image 120.

The information about the exterior of the landmark according to an embodiment may include various types of information for identifying the landmark in the image 120, e.g., information about a shape and a size of the landmark and information about text included in the landmark. The information about the exterior of the landmark according to an embodiment may be pre-stored information.

The landmark according to an embodiment may include various types of structures having features that are visually distinguishable from other structures. For example, the landmark may include buildings, ruins, signboards, signs, and sculptures.

When the landmark according to an embodiment is a road sign or a signboard, the landmark may include text related to an area where the landmark is located. The electronic device 1000 according to an embodiment may identify the landmark in the image by identifying text included in the landmark, or obtain the location information of the electronic device 1000 based on information indicated by the text.

The feature points according to an embodiment may be identified in the image 120 based on pre-defined information about the exterior of the feature points. For example, the feature points included in the landmark may be identified by comparing the pre-stored information about the exterior of the feature points to information about the exterior of the objects included in the image 120. Without being limited to the above-described example, the feature points may be identified in the image 120 in various manners.

When the plurality of feature points are identified in the image 120 according to an embodiment, the location information of the electronic device 1000 may be corrected based on information about the identified feature points. For example, the location information 110 of the electronic device 1000 may be corrected based on pre-stored location information of the feature points as the information about the feature points.

The location information of the feature points according to an embodiment may be pre-stored location information or be obtained based on information about a landmark corresponding to the feature points. For example, the electronic device 1000 may calculate the location information of the feature points based on pre-stored location information indicating a reference location of the landmark (e.g., the center of mass of the landmark). The electronic device 1000 may calculate the location information of the feature points by identifying locations of the feature points on the basis of the reference location of the landmark, based on the image 120.

The information about the landmark for calculating the location information of the feature points according to an embodiment may be pre-stored information. The electronic device 1000 according to an embodiment may identify the locations of the feature points on the basis of the reference location of the landmark by comparing the pre-stored information about the exterior of the landmark to information about the exterior of the landmark including the feature points in the image 120.

Without being limited to the above-described example, the location information of the feature points may be obtained in various manners.

The electronic device 1000 according to an embodiment may obtain the location information corresponding to the current location 130 of the electronic device 1000, based on the location information of the plurality of feature points obtained in the image 120. For example, the electronic device 1000 may obtain distances between the feature points and the electronic device 1000 based on information obtained by analyzing the image 120, and obtain the location information of the electronic device 1000 based on the distances and the location information of the feature points.

When the landmark or the feature points are not identified in the image captured to obtain the location information, the electronic device 1000 according to an embodiment may obtain the location information of the electronic device 1000 in a different manner. For example, when the electronic device 1000 enters a tunnel and any identifiable landmark is not present in the tunnel, the electronic device 1000 may not obtain the location information by identifying the landmark in the image. Therefore, instead of obtaining the location information by using the image, the electronic device 1000 may obtain the location information of the electronic device 1000 based on direction and speed information of the electronic device 1000.

Figure 2:
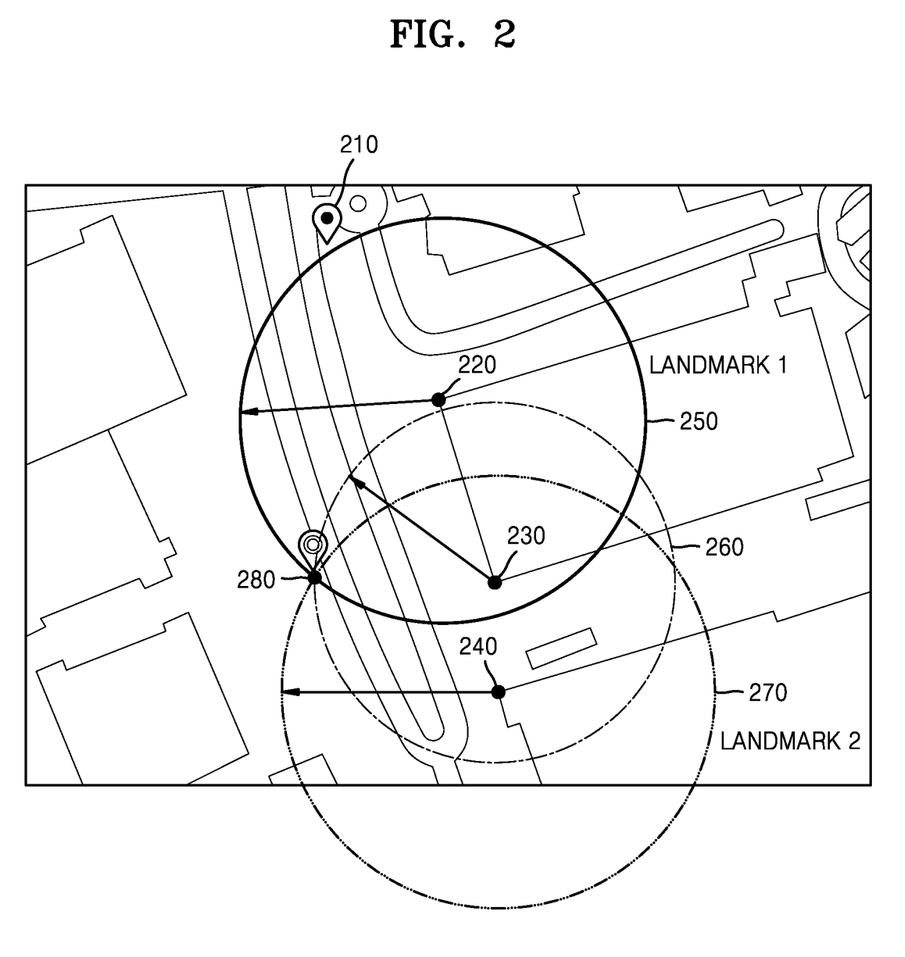
FIG. 2 is a diagram showing an example of obtaining location information of an electronic device based on location information of a plurality of feature points, according to an embodiment.

FIG. 2 is a diagram showing an example of obtaining location information of the electronic device 1000 based on location information of a plurality of feature points, according to an embodiment.

Referring to FIG. 2, the electronic device 1000 may capture an image including a landmark 1 and a landmark 2, at a current location 250.

Location information 210 according to an embodiment may include an error due to the characteristics of a sensor for detecting a location. The electronic device 1000 according to an embodiment may correct the location information 210 to a location equal or close to the current location 250, based on the captured image.

The electronic device 1000 according to an embodiment may identify feature points 220, 230, and 240 in the image captured at the current location 250. The electronic device 1000 according to an embodiment may identify a landmark included in the image, and then identify the feature points 220, 230, and 240 included in the image, by using the identified landmark.

The electronic device 1000 according to an embodiment may identify the landmark included in the image, based on information about the exterior of at least one landmark included in a region set on the basis of the location information 210, e.g., a region within a first distance (e.g., 500 m) on the basis of the location information 210. The information about the exterior of the at least one landmark according to an embodiment may be pre-stored information. The electronic device 1000 according to an embodiment may identify the landmark included in the image, by comparing the image to the pre-stored information about the exterior of the landmark. Without being limited to the above-described example, the landmark included in the image may be identified in various manners.

The electronic device 1000 according to an embodiment may identify the feature points included in the image from among feature points included in the landmark. The feature points included in the landmark according to an embodiment may be determined based on pre-stored information about the landmark. The feature points included in the image may be identified by comparing the image according to an embodiment to pre-stored information about the exterior near the feature points. Without being limited to the above-described example, the feature points included in the image may be identified in various manners.

The electronic device 1000 according to an embodiment may obtain a plurality of distances between the electronic device 1000 and the plurality of feature points identified in the image. The distances between the feature points and the electronic device according to an embodiment may be determined based on the features of an image sensor for capturing the image, and information about the feature points obtained in the image.

According to an embodiment, the distances between the feature points and the electronic device 1000 may be obtained as shown in Equation 1.

$$\text{Distance} = \frac{(\text{Focal length}) \times (\text{Real height of landmark}) \times (\text{Height of image frame})}{(\text{Height of landmark in image}) \times (\text{Size of image sensor})} \quad [\text{Equation 1}]$$

In Equation 1, the focal length refers to a focal length at a timing when the image is captured. Also, in Equation 1, the real height of the landmark is a value that may be obtained based on pre-stored information about the exterior of the landmark, and refers to a real height of the landmark including the feature points. The height of the image frame indicates the number of pixels corresponding to a vertical length of the image. The height of the landmark in the image indicates a pixel-based height of the landmark corresponding to the feature points included in the image. When the image includes only a part of the landmark, a total height of the landmark may be obtained based on the height of the part of the landmark. For example, the electronic device 1000 may identify the part of the landmark included in the image, based on the pre-stored information about the exterior of the landmark, and thus obtain the total height of the landmark based on the height of the part of the landmark.

According to an embodiment, in Equation 1, the real height of the landmark and the height of the landmark in the image are used to calculate a ratio of a size of the landmark in the captured image to a real size of the landmark, and thus are not limited to a total height or to only a height excluding a horizontal length. Therefore, the real height of the landmark and the height of the landmark in the image according to an embodiment are not limited to a total height of the landmark, and may be substituted by a horizontal length of the landmark or a horizontal or vertical length of the part of the landmark.

The size of the sensor indicates a millimeter (mm)-based size of the image sensor used to capture the image (e.g., a vertical length of the image sensor corresponding to the height of the image frame). According to an embodiment, light having passed through a camera lens for capturing an image in the electronic device 1000 may be transmitted to the image sensor, an image having a size corresponding to the height of the image frame may be generated on the image sensor, and thus the image including the feature points may be captured by the electronic device 1000.

Therefore, because the distance and the focal length, the real height of the landmark and the height of the landmark in the image, and the size of the sensor and the height of the image frame correspond to each other as values in the real world and the world inside the camera, the distances between the feature points and the electronic device 1000 may be obtained based on Equation 1.

Without being limited to the above-described example, the distances between the electronic device 1000 and the feature points according to an embodiment may be obtained in various manners based on the image. For example, the distances between the electronic device 1000 and the feature points may be obtained through image analysis by using an AI model pre-trained to obtain a distance between the electronic device 1000 and an object included in the image.

The electronic device 1000 according to an embodiment may generate circles 250, 260, and 270 having the distances between the electronic device 1000 and the feature points 220, 230, and 240 obtained based on the image, as radii, and having the feature points 220, 230, and 240 as centers. The plurality of the circles 250, 260, and 270 according to an embodiment may be generated by using the feature points 220, 230, and 240 as centers and using the distances between the feature points and the electronic device 1000 as radii.

The plurality of the circles 250, 260, and 270 according to an embodiment are circles having the distances between the electronic device 1000 and the feature points as radii, and thus a point through which the plurality of circles commonly pass may be determined as a real location of the electronic device 1000. Therefore, the location information 210 of the electronic device 1000 may be corrected based on a point where the plurality of the circles 250, 260, and 270 overlap each other. For example, the location information 210 may be corrected to include a point 280 where the plurality of the circles 250, 260, and 270 overlap each other, as information about the current location of the electronic device 1000.

According to an embodiment, although the plurality of the circles 250, 260, and 270 do not exactly overlap each other, the location information 210 of the electronic device 1000 may be corrected to location information 280 corresponding to the point where the plurality of the circles 250, 260, and 270 overlap each other within a preset error range (e.g., within a 1-meter (m) radius).

According to an embodiment, the point 280 where the largest number of circles overlap each other within the preset error range from among points where the plurality of the circles 250, 260, and 270 overlap each other may be obtained as the location information of the electronic device 1000.

With regard to a distance between at least two feature points from among the plurality of feature points, the electronic device 1000 according to an embodiment may obtain a difference between a second distance obtained based on pre-stored information, and a third distance obtained through image analysis. The electronic device 1000 according to an embodiment may determine whether to use the at least two feature points to obtain the location information of the electronic device 1000, based on the difference. The second distance between the at least two feature points according to an embodiment may be obtained based on pre-stored information about the feature points, e.g., information about a landmark including the feature points. The distance obtained through image analysis may be obtained using, for example, a pre-trained AI model.

According to an embodiment, when the difference between the second and third distances is large, it may be determined that the information pre-stored as the information about the feature points significantly differs from current statuses of the feature points in the captured image. For example, when the landmark including the feature points has moved, the pre-stored information about the landmark before moving may not be used to obtain the location information of the electronic device 1000.

Therefore, when the difference between the second and third distances is less than or equal to a reference value, the electronic device 1000 according to an embodiment may use the at least two feature points to obtain the location information of the electronic device 1000.

Figure 3:
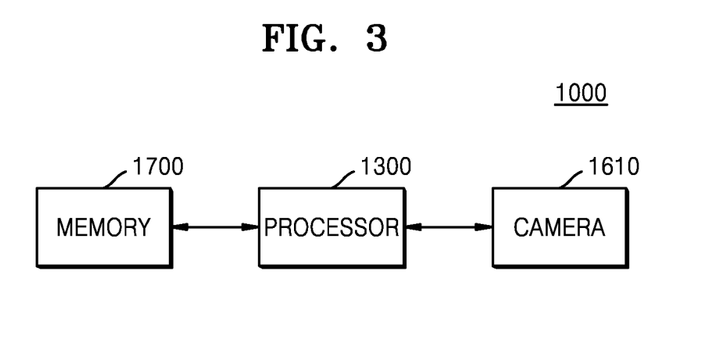
FIG. 3 is a block diagram of an electronic device according to an embodiment.

FIG. 3 is a block diagram of the electronic device 1000 according to an embodiment.

Figure 4:
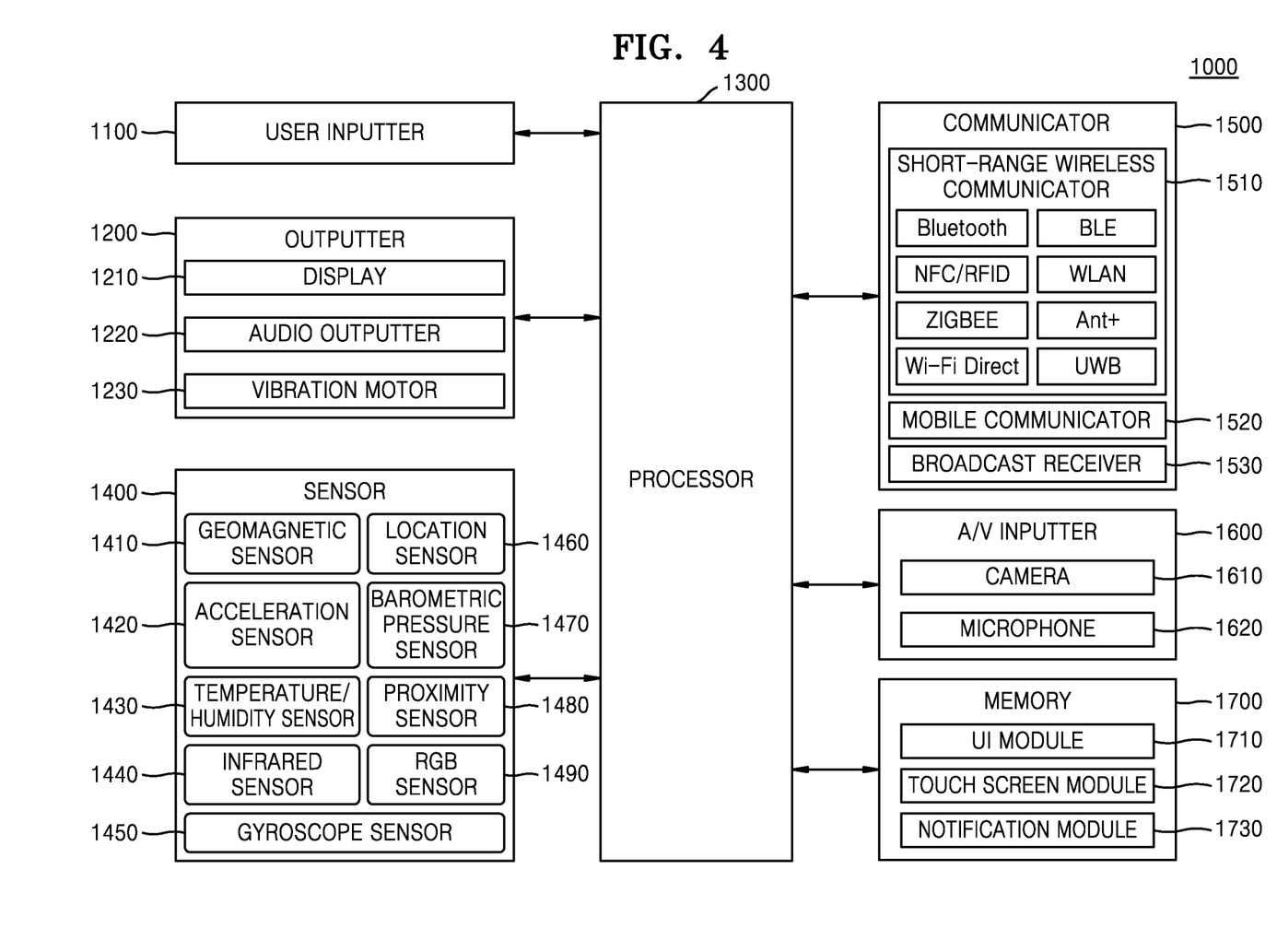
FIG. 4 is a block diagram of an electronic device according to an embodiment.

FIG. 4 is a block diagram of the electronic device 1000 according to an embodiment.

Referring to FIG. 3, the electronic device 1000 may include a processor 1300, a memory 1700, and a camera 1610. However, not all elements illustrated in FIG. 3 are essential elements of the electronic device 1000. The electronic device 1000 may include a larger or smaller number of elements compared to those illustrated in FIG. 3.

For example, as illustrated in FIG. 4, in addition to the processor 1300, the memory 1700, and the camera 1610, the electronic device 1000 according to an embodiment may further include a user inputter 1100, a sensor 1400, an audio/video (A/V) inputter 1600, a communicator 1520, and an outputter 1020.

The user inputter 1100 refers to a means by which a user inputs data for controlling the electronic device 1000. For example, the user inputter 1100 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto.

According to an embodiment, the user inputter 1100 may receive a user input for obtaining location information of the electronic device 1000.

The outputter 1200 may output an audio signal, a video signal, or a vibration signal, and include a display 1210, an audio outputter 1220, and a vibration motor 1230.

The display 1210 displays data processed in the electronic device 1000. According to an embodiment, the display 1210 may display the location information of the electronic device 1000.

Meanwhile, when a touchpad is layered on the display 1210 to configure a touchscreen, the display 1210 may be used not only as an output device but also as an input device. The display 1210 may include at least one of a liquid crystal display, a thin film transistor-liquid crystal display, an organic light-emitting diode, a flexible display, a three-dimensional (3D) display, and an electrophoretic display. Depending on implementation of the electronic device 1000, the electronic device 1000 may include two or more displays 1210.

The audio outputter 1220 outputs audio data received from the communicator 1500 or stored in the memory 1700. According to an embodiment, the audio outputter 1220 may output audio data indicating the location information of the electronic device 1000.

The vibration motor 1230 may output a vibration signal. When touch is input to the touchscreen, the vibration motor 1230 may also output a vibration signal. According to an embodiment, the vibration motor 1230 may output a vibration signal indicating the location information of the electronic device 1000.

The processor 1300 generally controls overall operations of the electronic device 1000. For example, the processor 1300 may execute programs stored in the memory 1700 to control the user inputter 1100, the outputter 1200, the sensor 1400, the communicator 1500, and the A/V inputter 1600.

The electronic device 1000 may include at least one processor 1300. For example, the electronic device 1000 may include various types of processors, e.g., a central processing unit (CPU), a graphics processing unit (GPU), and a neural processing unit (NPU).

The processor 1300 may be configured to process commands of a computer program by performing basic arithmetic, logic, and input/output operations. The commands may be provided from the memory 1700 to the processor 1300, or be received through the communicator 1500 and be provided to the processor 1300. For example, the processor 1300 may be configured to execute commands based on program code stored in a recording device such as memory.

The processor 1300 according to an embodiment may identify a plurality of feature points in at least one image captured by the electronic device 1000, and obtain a plurality of distances between the plurality of feature points and the electronic device 1000. The distances between the feature points and the electronic device 1000 may be obtained based on at least one of a focal length at a timing when the image is captured, a real height of a landmark including the feature points, a frame-based height of the image, a frame-based height of the landmark including the feature points in the image, and a size of an image sensor used to capture the image.

The processor 1300 according to an embodiment may obtain the location information of the electronic device 1000 based on a point where a plurality of circles having the plurality of distances as radii and having the feature points as centers overlap each other.

The sensor 1400 may detect a status of the electronic device 1000 or an ambient environment of the electronic device 1000, and transmit the detected information to the processor 1300.

The sensor 1400 may include at least one of a geomagnetic sensor 1410, an acceleration sensor 1420, a temperature/humidity sensor 1430, an infrared sensor 1440, a gyroscope sensor 1450, a location sensor (e.g., a global positioning system (GPS)) 1460, a barometric pressure sensor 1470, a proximity sensor 1480, and an RGB (or illuminance) sensor 1490, but is not limited thereto.

The communicator 1500 may include one or more elements for enabling the electronic device 1000 to communicate with a server (not shown) or an external device (not shown). For example, the communicator 1500 may include a short-range wireless communicator 1510, a mobile communicator 1520, and a broadcast receiver 1530.

The short-range wireless communicator 1510 may include a Bluetooth communicator, a Bluetooth low energy (BLE) communicator, a near-field communication (NFC) communicator, a wireless local area network (WLAN) (or Wi-Fi) communicator, a Zigbee communicator, an infrared data association (IrDA) communicator, a Wi-Fi direct (WFD) communicator, a ultra-wideband (UWB) communicator, or an Ant+ communicator, but is not limited thereto.

The mobile communicator 1520 transmits and receives radio signals to and from at least one of a base station, an external terminal, and a server in a mobile communication network. Herein, the radio signals may include various types of data based on transmission and reception of voice call signals, video call signals, or text/multimedia messages.

The broadcast receiver 1530 receives broadcast signals and/or broadcast information through broadcast channels from outside. The broadcast channels may include satellite channels and terrestrial channels. Depending on implementation, the electronic device 1000 may not include the broadcast receiver 1530.

The communicator 1500 according to an embodiment may transmit and receive, to and from the external device, data required to obtain the location information of the electronic device 1000.

The A/V inputter 1600 is used to input audio signals or video signals, and may include the camera 1610 and a microphone 1620. The camera 1610 may obtain still images or image frames of a video by using an image sensor in a video call mode or a camera mode. The images captured by the image sensor may be processed through the processor 1300 or a separate image processor (not shown).

The camera 1610 according to an embodiment may capture at least one image for obtaining the location information of the electronic device 1000.

The microphone 1620 receives an external audio signal and processes the same into electrical voice data. For example, the microphone 1620 may receive a voice input of the user for obtaining the location information of the electronic device 1000.

The memory 1700 may store programs for processing and control operations of the processor 1300, and also store data input to or to be output from the electronic device 1000.

The memory 1700 according to an embodiment may store data required to identify the feature points included in the image and to obtain the distances between the identified feature points and the electronic device 1000. For example, the memory 1700 may store information about a landmark for identifying the feature points included in the image, and obtaining the distances between the identified feature points and the electronic device 1000. The information about the landmark according to an embodiment may include various types of information about the landmark, e.g., information about the exterior features of the landmark, information about a location of the landmark, and information about a size of the landmark.

The memory 1700 according to an embodiment may also store various types of data required to obtain a real distance between at least two feature points and a distance obtained through image analysis.

The memory 1700 may include at least one type of storage medium from among flash memory, a hard disk, a multimedia card micro, a memory card (e.g., a secure digital (SD) or extreme digital (XD) memory card), random access memory (RAM), static RAM (SRAM), read-only memory (ROM), electrically erasable programmable ROM (EEPROM), programmable ROM (PROM), magnetic memory, a magnetic disc, and an optical disc.

The programs stored in the memory 1700 may be classified into a plurality of modules, e.g., a user interface (UI) module 1710, a touchscreen module 1720, and a notification module 1730, depending on functions thereof.

The UI module 1710 may provide a specialized UI or graphical user interface (GUI) connected to the electronic device 1000 for each application. The touchscreen module 1720 may detect a touch gesture of the user on a touchscreen, and transmit information about the touch gesture to the processor 1300. The touchscreen module 1720 according to an embodiment may recognize and analyze touch code. The touchscreen module 1720 may be configured as separate hardware including a controller.

Various sensors may be provided in or near the touchscreen to detect touch or proximity touch on the touchscreen. The sensors for detecting touch on the touchscreen may include, for example, a tactile sensor. The tactile sensor refers to a sensor for detecting touch of a certain object like or better than a human. The tactile sensor may detect various types of information, e.g., roughness of a touch surface, hardness of a touch object, and temperature at a touch point.

The touch gesture of the user may include tap, touch & hold, double tap, drag, pan, flick, drag & drop, swipe, etc.

The notification module 1730 may generate a notification signal to notify that an event of the electronic device 1000 has occurred.

Figure 5:
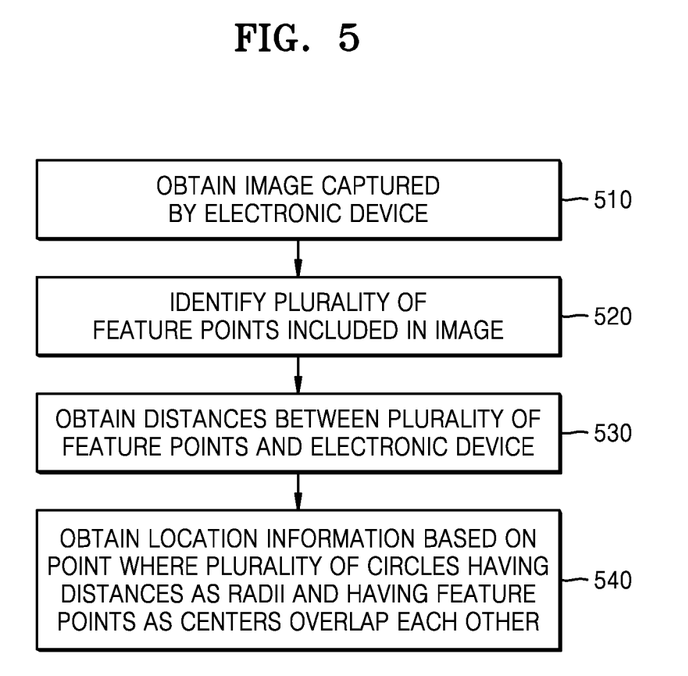
FIG. 5 is a flowchart of a method of obtaining location information of an electronic device, according to an embodiment.

FIG. 5 is a flowchart of a method of obtaining location information of the electronic device 1000, according to an embodiment.

Referring to FIG. 5, in operation 510, the electronic device 1000 may obtain at least one image captured by the electronic device 1000. The at least one image may be an image captured by the electronic device 1000 at a location corresponding to location information desired to be obtained according to an embodiment.

In operation 520, the electronic device 1000 may identify a plurality of feature points in the at least one image obtained in operation 510. The feature points according to an embodiment may be identified based on information about at least one landmark identified in the image.

The at least one landmark according to an embodiment may be identified based on whether the landmark is present in a region of interest determined as a region within a first distance on the basis of location information of the electronic device 1000, which is detected using a location sensor. The first distance may be preset, or be determined based on distances between the electronic device 1000 and objects included in the image.

The at least one landmark according to an embodiment may be identified as at least one landmark included in the image from among landmarks included in the region of interest. For example, the electronic device 1000 may identify the landmark by comparing information about the exterior of the landmark to the features of the objects included in the image, and identify the feature points in the landmark.

Without being limited to the above-described example, the electronic device 1000 may identify the plurality of feature points in the image in various manners.

However, when the landmark including the feature points has moved and thus location information of the feature points, which is obtained based on pre-stored information about the landmark, does not match current locations of the feature points included in the image, the feature points may not be used to obtain the location information of the electronic device 1000.

Therefore, the electronic device 1000 according to an embodiment may calculate distances between the feature points to determine feature points to be used to obtain the location information of the electronic device 1000 in operations 530 and 540 from among the feature points identified in operation 520.

The electronic device 1000 according to an embodiment may obtain a second distance between at least two feature points based on location information of the at least two feature points, which is obtained based on the pre-stored information about the landmark. The electronic device 1000 may also obtain a third distance between the at least two feature points by analyzing the image.

For example, the electronic device 1000 may obtain the third distance between the at least two feature points included in the image, by using a pre-trained AI model. The AI model for obtaining the third distance according to an embodiment may be pre-trained to estimate the third distance between the at least two feature points by estimating shapes of edges or sizes of objects included in the image through image analysis. Without being limited to the above-described example, the third distance may be obtained in various manners.

The electronic device 1000 according to an embodiment may determine feature points to be used to obtain the location information of the electronic device 1000 from among the feature points identified in operation 520, based on a difference between the second and third distances.

According to an embodiment, when pre-stored location information of the landmark matches a current location of the landmark at a timing when the image is captured, the second distance may equal the third distance within an error range.

Therefore, when the difference between the second and third distances is greater than a reference value, the pre-stored location information of the landmark is considered not to match the current location of the landmark and may not be used to obtain the location information of the electronic device 1000.

According to an embodiment, feature points for which the difference between the second and third distances is less than or equal to the reference value may be determined as feature points to be used to obtain the location information of the electronic device 1000.

In operation 530, the electronic device 1000 may obtain distances between the plurality of feature points and the electronic device 1000. The distances between the electronic device 1000 and the feature points according to an embodiment may be obtained based on the image and pre-stored information about the feature points.

The pre-stored information about the feature points according to an embodiment may include information about locations of the feature points and information about a size (e.g., a vertical or horizontal length) of the landmark including the feature points. The electronic device 1000 according to an embodiment may obtain the distances between the electronic device 1000 and the feature points based on the pre-stored information about the feature points and information obtained through image analysis. For example, the electronic device 1000 may obtain the distances between the electronic device 1000 and the feature points by using a pre-trained AI model based on at least one of the pre-stored information about the feature points and the information obtained through image analysis.

Without being limited to the above-described example, the electronic device 1000 may obtain the distances between the electronic device 1000 and the feature points in various manners based on various types of information, e.g., a focal length of the image, a size (e.g., a vertical or horizontal length) of an image sensor, and the number of pixels in a horizontal or vertical direction of the image.

In operation 540, the electronic device 1000 may generate a plurality of circles having the distances obtained in operation 530, as radii, and having the feature points as centers, and obtain the location information of the electronic device 1000 based on a point where the plurality of circles overlap each other.

The electronic device 1000 according to an embodiment may obtain a number of pieces of location information corresponding to the plurality of feature points identified in the image.

The location information of the feature points according to an embodiment may be obtained based on the pre-stored location information of the landmark. For example, the location information of the feature points may be obtained by determining the locations of the feature points on the basis of the location of the landmark based on the location information of the landmark including the feature points. Without being limited to the above-described example, the location information of the feature points may be obtained in various manners.

The electronic device 1000 according to an embodiment may draw, on a map, a plurality of circles having the locations of the feature points as centers and having the distances obtained in operation 530, as radii. The electronic device 1000 according to an embodiment may obtain a point where the plurality of circles overlap each other, as the location information of the electronic device 1000.

Although the plurality of circles do not exactly overlap each other at a point, the electronic device 1000 according to an embodiment may obtain a point where the largest number of circles from among the plurality of circles overlap each other within a preset error range, as the location information of the electronic device 1000.

Figure 6:
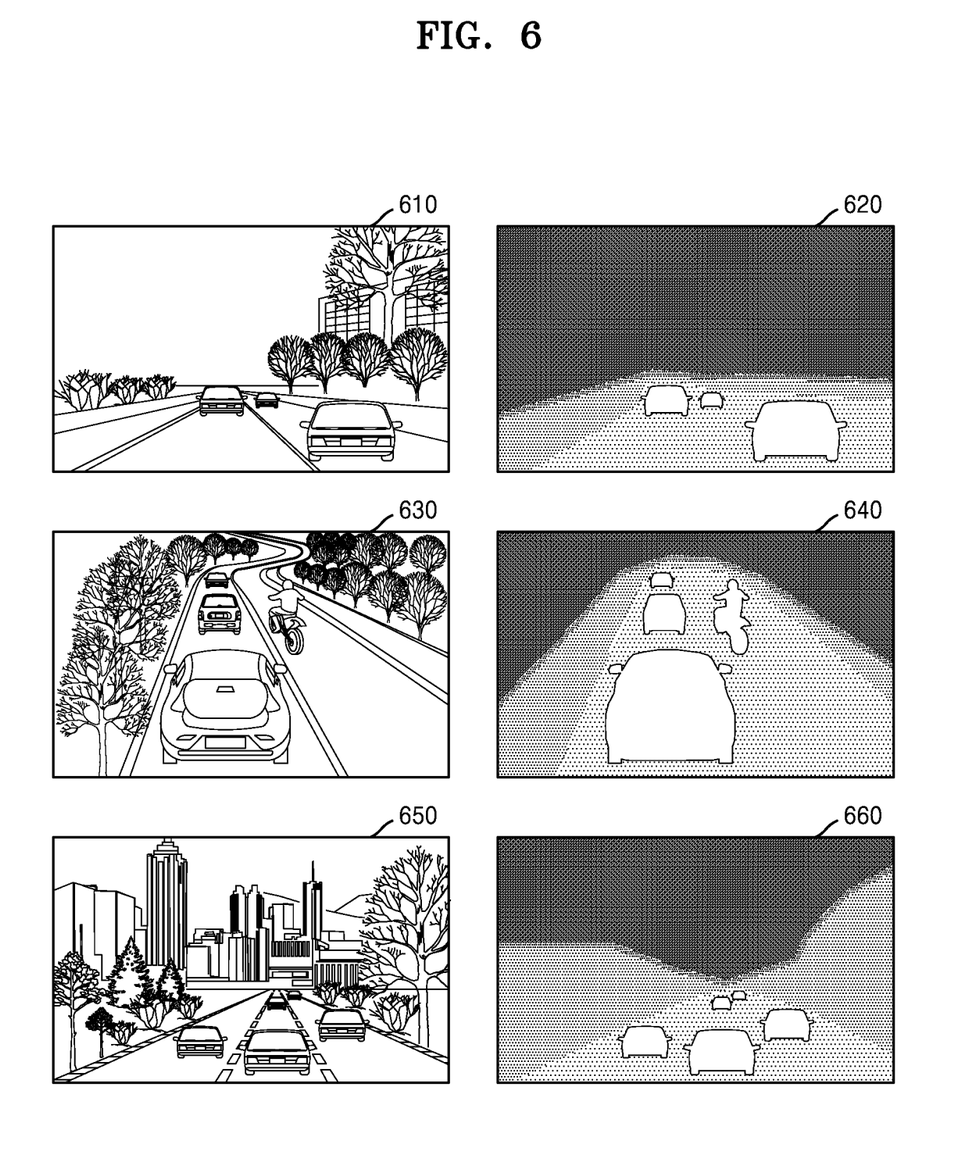
FIG. 6 is a diagram showing an example of calculating distances between an electronic device and objects included in an image, according to an embodiment.

FIG. 6 is a diagram showing an example of calculating distances between the electronic device 1000 and objects included in an image, according to an embodiment.

Referring to FIG. 6, the electronic device 1000 may analyze images 610, 630, and 650 and thus distances between objects included in the images and the electronic device 1000 having captured the images may be represented as shown in disparity maps 620, 640, and 660. According to an embodiment, the distances between the electronic device 1000 and the objects included in the images may be obtained by analyzing the images based on a pre-trained AI model.

According to the disparity maps illustrated in FIG. 6, when a distance from the electronic device 1000 having captured the image is long, an object included in the image may be shown in a dark color. On the other hand, when the distance from the electronic device 1000 is short, the object may be shown in a bright color.

The electronic device 1000 according to an embodiment may set a region of interest for obtaining feature points, by determining a first distance based on a disparity map of at least one image. The electronic device 1000 according to an embodiment may determine whether to use the feature points to obtain location information of the electronic device 1000, by, determining a third distance based on the disparity map of the at least one image. Without being limited to the above-described example, the electronic device 1000 may obtain the location information of the electronic device 1000 by using the disparity map in various manners.

According to an embodiment, location information of an electronic device may be more precisely and accurately corrected based on an image.

A machine-readable storage medium may be provided in the form of a non-transitory storage medium. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer for temporarily storing data.

According to an embodiment, the method according to various embodiments of the disclosure may be included and provided in a computer program product. The computer program product may be traded as a commercial product between a seller and a buyer. The computer program product may be distributed in the form of a machine-readable storage medium (e.g., a compact disc read only memory (CD-ROM)), or be electronically distributed (e.g., downloaded or uploaded) via an application store (e.g., Play Store™) or directly between two user devices (e.g., smartphones). For electronic distribution, at least a part of the computer program product (e.g., a downloadable app) may be temporarily generated or be at least temporarily stored in a machine-readable storage medium, e.g., a memory of a server of a manufacturer, a server of an application store, or a relay server.

As used herein, the term "unit" may indicate a hardware component such as a processor or a circuit, and/or a software component executed by the hardware component such as the processor.

The above descriptions of the disclosure are provided for the purpose of illustration, and it will be understood by one of ordinary skill in the art that various changes in form and details may be made therein without departing from the scope of the disclosure. Therefore, it should be understood that the afore-described embodiments should be considered in a descriptive: sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it should be understood that all modifications from the claims and their equivalents are included in the scope of the disclosure.

The invention claimed is:

1. A method, performed by an electronic device, of obtaining location information of the electronic device, the method comprising:
    capturing, by the electronic device, at least one image;
    identifying a plurality of feature points included in the at least one image based on a landmark identified in the at least one image;
    obtaining a plurality of distances between feature points of the plurality of feature points and the electronic device based on features of an image sensor for capturing the at least one image, information about the plurality of feature points obtained in the at least one image, and location information of the plurality of feature points based on pre-stored information about the landmark including text information in the landmark;
    generating a plurality of circles having the obtained plurality of distances as radii and having the plurality of feature points as centers, respectively; and
    obtaining location information of the electronic device based on a point where the plurality of circles overlap each other,
    wherein obtaining the plurality of distances between the plurality of feature points and the electronic device further comprises:
    selecting at least two feature points from among the plurality of feature points;
    obtaining a second distance indicating a distance between the at least two feature points, based on pre-stored information about feature point locations;
    obtaining a third distance indicating the distance between the at least two feature points, by analyzing the at least one image; and
    determining whether to use the at least two feature points to obtain the location information of the electronic device, based on a difference between the second distance and the third distance.

2. The method of claim 1, wherein a point where the plurality of circles overlap each other within a preset error range is obtained as the location information of the electronic device.

3. The method of claim 1, wherein identifying the plurality of feature points comprises:
    setting a region of interest based on location information detected by a location sensor of the electronic device;
    identifying at least one landmark included in the at least one image from among one or more landmarks included in the region of interest; and
    identifying the plurality of feature points in the identified at least one landmark.

4. The method of claim 3, wherein the region of interest is within a first distance of the location information detected by the location sensor of the electronic device, and
    wherein the first distance is determined based on a longest distance among distances between the electronic device and objects included in the at least one image.

5. The method of claim 1, wherein the plurality of distances between the plurality of feature points and the electronic device are obtained based on at least one of information about a size of an image sensor used to capture the at least one image, information about a focal length of the at least one image, a height of a landmark including at least two feature points of the plurality of feature points, a frame-based height of the landmark, and a frame-based height of the at least one image.

6. The method of claim 1, wherein obtaining the plurality of distances between the plurality of feature points and the electronic device further comprises:
    obtaining distances between the electronic device and the at least two feature points based on the determination of whether to use the at least two feature points to obtain the location information of the electronic device.

7. The method of claim 6, wherein the at least two feature points are used to obtain the location information of the electronic device when the difference between the second distance and the third distance is less than or equal to a reference value.

8. A non-transitory computer-readable recording medium having recorded thereon a computer program for executing the method of claim 1.

9. An electronic device for obtaining location information of the electronic device, the electronic device comprising:
    a camera configured to capture at least one image;
    a memory configured to store data required to obtain location information of the electronic device; and
    at least one processor configured to:
        identify a plurality of feature points included in the at least one image, based on a landmark identified in the at least one image,
        obtain a plurality of distances between feature points of the plurality of feature points and the electronic device based on features of an image sensor for capturing the at least one image, information about the plurality of feature points obtained in the at least one image, and location information of the plurality of feature points based on pre-stored information about the landmark including text information in the landmark,
        generate a plurality of circles having the obtained plurality of distances as radii and having the plurality of feature points as centers, respectively,
        obtain location information of the electronic device based on a point where the plurality of circles overlap each other,
        select at least two feature points from among the plurality of feature points, obtain a second distance indicating a distance between the at least two feature points, based on pre-stored information about feature point locations, obtain a third distance indicating the distance between the at least two feature points, by analyzing the at least one image, and determine whether to use the at least two feature points to obtain the location information of the electronic device, based on a difference between the second distance and the third distance.

10. The electronic device of claim 9, wherein a point where the plurality of circles overlap each other within a preset error range is obtained as the location information of the electronic device.

11. The electronic device of claim 9, wherein the at least one processor is further configured to:

set a region of interest based on location information detected by a location sensor of the electronic device;

identify at least one landmark included in the at least one image from among one or more landmarks included in the region of interest; and identify the plurality of feature points in the identified at least one landmark.

12. The electronic device of claim 11, wherein the region of interest is within a first distance of the location information detected by the location sensor of the electronic device, and wherein the first distance is determined based on a longest distance among distances between the electronic device and objects included in the at least one image.

13. The electronic device of claim 9, wherein the plurality of distances between the plurality of feature points and the electronic device are obtained based on at least one of information about a size of an image sensor used to capture the at least one image, information about a focal length of the at least one image, a height of a landmark including the feature points, a frame-based height of the landmark, and a frame-based height of the at least one image.

14. The electronic device of claim 9, wherein the at least one processor is further configured to:

obtain distances between the electronic device and the at least two feature points based on the determination of whether to use the at least two feature points to obtain the location information of the electronic device.

15. The electronic device of claim 14, wherein the at least two feature points are determined to be used to obtain the location information of the electronic device, when the difference between the second distance and third distance is less than or equal to a reference value.

* * * * *